United States Patent
Hara

(10) Patent No.: US 8,219,018 B2
(45) Date of Patent: Jul. 10, 2012

(54) IMAGE GENERATING PROGRAM, STORAGE MEDIUM, IMAGE PROCESSING METHOD, AND IMAGE PROCESSING DEVICE

(75) Inventor: Fumiaki Hara, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 908 days.

(21) Appl. No.: 11/496,496

(22) Filed: Aug. 1, 2006

(65) Prior Publication Data

US 2007/0032297 A1    Feb. 8, 2007

(30) Foreign Application Priority Data

Aug. 2, 2005   (JP) ................................. 2005-224716

(51) Int. Cl.
*G03G 15/00*    (2006.01)
*A63F 9/24*    (2006.01)
*A63F 13/00*    (2006.01)
*G06F 17/00*    (2006.01)
*G06F 19/00*    (2011.01)

(52) U.S. Cl. ............... 399/367; 463/32; 463/33; 463/34

(58) Field of Classification Search ............... 463/31–33
See application file for complete search history.

(56) References Cited

U.S. PATENT DOCUMENTS

| | | | |
|---|---|---|---|
| 4,930,074 A * | 5/1990 | McCarthy | 463/31 |
| 5,239,463 A * | 8/1993 | Blair et al. | 463/3 |
| 5,952,993 A | 9/1999 | Matsuda et al. | |
| 6,018,348 A * | 1/2000 | Sprague | 345/421 |
| 6,217,446 B1 * | 4/2001 | Sanbongi et al. | 463/7 |
| 6,313,838 B1 * | 11/2001 | Deering | 345/420 |
| 6,322,448 B1 * | 11/2001 | Kaku et al. | 463/32 |
| 6,480,205 B1 | 11/2002 | Greene et al. | |
| 6,590,852 B1 | 7/2003 | McCormick, Jr. | |
| 6,765,571 B2 * | 7/2004 | Sowizral et al. | 345/420 |
| 6,801,930 B1 * | 10/2004 | Dionne et al. | 709/205 |

(Continued)

FOREIGN PATENT DOCUMENTS

JP    6-269566    9/1994

(Continued)

OTHER PUBLICATIONS

Teller, Seth et al., "Frustrum Casting for Progressive, Interactive Rendering" MIT Laboratory for Computer Science, Jan. 1998.

(Continued)

*Primary Examiner* — Dmitry Suhol
*Assistant Examiner* — Kevin Y Kim
(74) *Attorney, Agent, or Firm* — Finnegan, Henderson, Farabow, Garrett & Dunner, L.L.P.

(57) ABSTRACT

An image generating program, a storage medium, an image processing method, and an image processing device are provided capable of carrying out very detailed image control while preventing wastage of resources.

This is configured such that a area of a movement path present in a viewing frustum is calculated, then a determination is made based on the area as to whether or not moving objects are to be generated, and when it is determined that moving objects are to be generated, information of the moving objects to be generated is stored in storage means such that positions of moving objects present in the viewing frustum are renewed based on the information of the plurality of moving objects stored in the storage means and images of the plurality of moving objects are generated.

10 Claims, 8 Drawing Sheets

U.S. PATENT DOCUMENTS

| | | | | |
|---|---|---|---|---|
| 2002/0151361 | A1* | 10/2002 | Goden et al. | 463/33 |
| 2003/0109296 | A1 | 6/2003 | Leach et al. | |
| 2003/0217297 | A1* | 11/2003 | Gschwind et al. | 713/300 |
| 2003/0235338 | A1* | 12/2003 | Dye | 382/232 |

FOREIGN PATENT DOCUMENTS

| | | |
|---|---|---|
| JP | H09-062864 A | 3/1997 |
| JP | H09-167259 A | 6/1997 |
| JP | 10-165647 | 6/1998 |
| JP | 2003-079942 A | 3/2003 |
| JP | 2003-311003 A | 11/2003 |

OTHER PUBLICATIONS

Coorg, Satyan et al., "Temporarily Coherent Conservative Visibility," MIT Synthetic Imagery Group, May 24, 1996.

European Search Report and examination report mailed Feb. 22, 2007 in counterpart European Application No. 6254062.

* cited by examiner

IMAGE GENERATING PROGRAM, STORAGE MEDIUM, IMAGE PROCESSING METHOD, AND IMAGE PROCESSING DEVICE

CROSS-REFERENCES

The present invention relates to image generating programs, storage media, image processing methods, and image processing devices and for example may be applied to a game device that provides a three-dimensional action adventure type game.

BACKGROUND

Conventionally there are three-dimensional action adventure type games that are set in busy downtown streets and in which the user's character moves through the streets while talking and fighting with the people present there as the story advances. In these types of games, effort is made to depict the busy downtown streets by displaying on the game screen a large number of passersby who do not contribute to the progress of the game.

However, if detailed control is to be carried out in these games for each passerby individually using AI (artificial intelligence) or the like, there is a problem that a very large load is placed on the CPU (central processing unit) of the game device and sufficient processing for drawing may not be possible in practical use.

Restricting the number of passersby that appear on the game screen is conceivable as a technique for solving this problem (for example, see Japanese patent application JP H10-165647A). However, in this case, merely restricting the number of passersby that appear on a single game screen reduces the quality of the game graphically.

Accordingly, it is conceivable that if very detailed control could be achieved even when restricting the number of passersby appearing on the game screen by not uniformly restricting the number of passersby throughout all scenes of the game screen but rather not restricting the number of passersby in certain portions of the game screen and restricting the number of passersby in certain other portions, then very detailed scene control could be achieved while preventing any reduction in the quality of the game.

However, in previously disclosed methods, it is not possible to restrict the number of passersby that appear on the game screen for each portion of the game screen.

Furthermore, with conventional games, there is a problem in that memory resources continue to be maintained for objects (people and things) that have left the game screen in order to manage those objects after they have left the game screen regardless of whether or not there is a necessity to manage their positions and movements, and moreover there is a problem of wasteful cases in which several codes are being executed (memory resources being used even though nothing is shown on the game screen).

SUMMARY

The present invention has been devised in light of these issues and is aimed at providing an image generating program, a storage medium, an image processing method, and an image processing device capable of carrying out very detailed image control while preventing wastage of resources.

In order to address these issues, the present invention is configured such that there is an image generating program executed on an image processing device that comprises control means, storage means, and image display means, wherein a viewpoint, a movement path having a predetermined shape, and a plurality of moving objects that move on the movement path are arranged in a virtual three-dimensional space, and the moving objects present in a viewing frustum, which is a field-of-view range of the viewpoint, are drawn by being projected on a two-dimensional plane, the image generating program causing the control means to execute: a first step of calculating a area of the movement path present within a region based on a field-of-view region, a second step of determining whether or not the moving objects are to be generated based on the area, a third step, when a determination is made that the moving objects are to be generated, of storing in the storage means information of the moving objects to be generated, a fourth step of renewing positions of the moving objects present in the viewing frustum based on information of the plurality of moving objects stored in the storage means, and a fifth step of generating images of the plurality of moving objects.

Furthermore, in the present invention, the image generating program is configured to be stored in a storage medium.

Another aspect of the present invention is an image processing method wherein a viewpoint, a movement path having a predetermined shape, and a plurality of moving objects that move on the movement path are arranged in a virtual three-dimensional space, and the moving objects present in a viewing frustum, which is a field-of-view range of the viewpoint, are drawn by being projected on a two-dimensional plane, comprising a first step of calculating a area of the movement path present within a region based on a field-of-view region, a second step of determining whether or not the moving objects are to be generated based on the area, a third step, when a determination is made that the moving objects are to be generated, of storing in the storage means information of the moving objects to be generated, a fourth step of renewing positions of the moving objects present in the viewing frustum based on information of the plurality of moving objects stored in the storage means, and a fifth step of generating images of the plurality of moving objects.

Another aspect of the present invention is an image processing device comprising control means, storage means, and image display means, wherein a viewpoint, a movement path having a predetermined shape, and a plurality of moving objects that move on the movement path are arranged in a virtual three-dimensional space, and the moving objects present in a viewing frustum, which is a field-of-view range of the viewpoint are drawn by being projected on a two-dimensional plane, comprising area calculation means for calculating a area of the movement path present within a region based on a field-of-view region, determination means for determining whether or not the moving objects are to be generated based on the area, storage control means for, when a determination is made that the moving objects are to be generated, storing in the storage means information of the moving objects to be generated, renewing means for renewing positions of the moving objects present in the viewing frustum based on information of the plurality of moving objects stored in the storage means, and image generation means for generating images of the plurality of moving objects.

With the present invention, restriction of the number of passersby that appear on the game screen can be carried out for each portion of the game screen, and it is possible to prevent memory resources for managing moving objects that have moved away from the game screen from being used wastefully. Thus, an image generating program, a storage medium, an image processing method, and an image processing device can be achieved that are capable of carrying out very detailed image control while preventing wastage of resources.

BEST MODE FOR CARRYING OUT THE INVENTION

DETAILED DESCRIPTION

An embodiment of the present invention is described with reference to the accompanying drawings.

(1) Configuration of Game Device According to Present Embodiment

Figure 1:
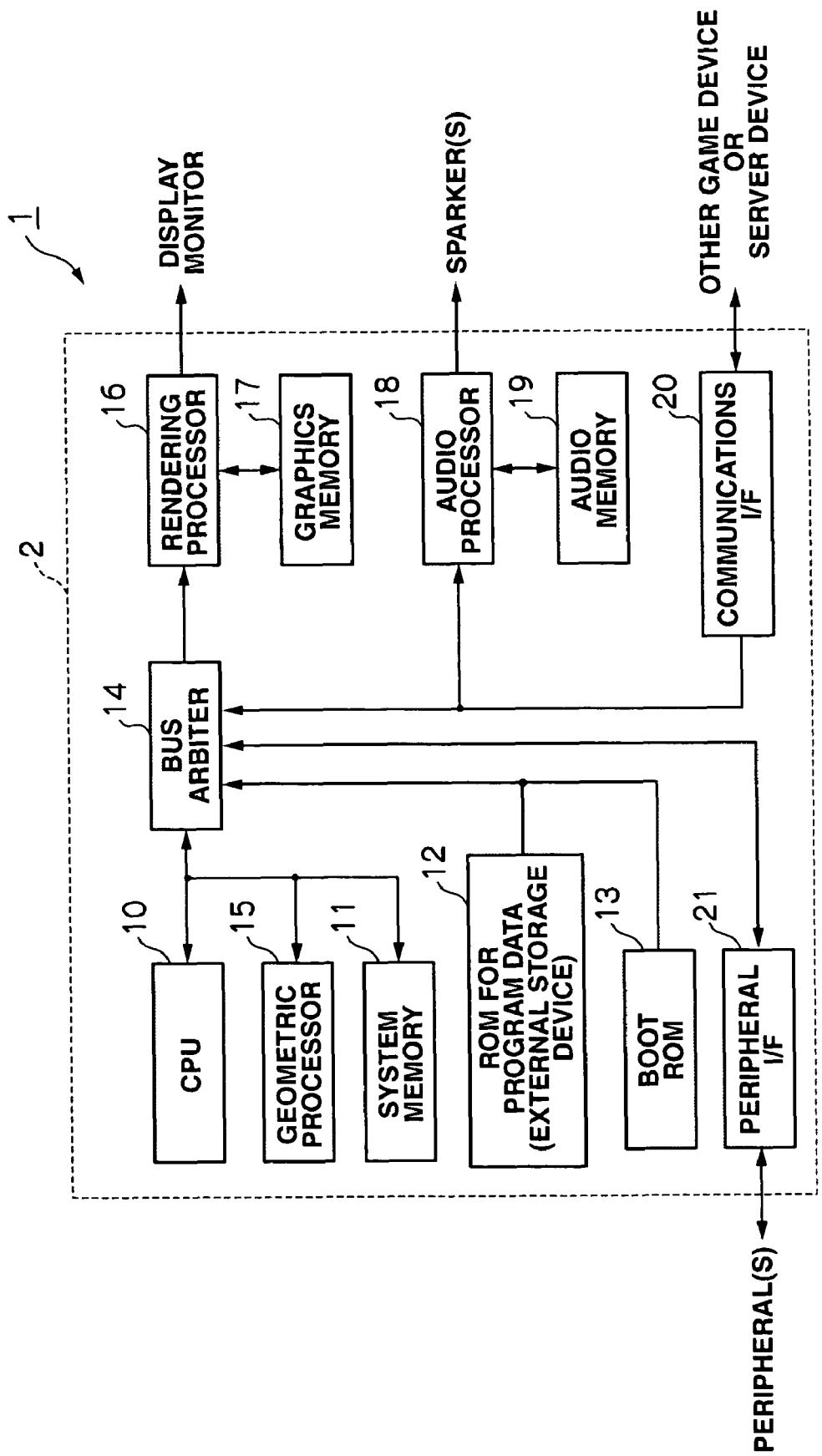
FIG. 1 is a block diagram illustrating a configuration of an image processing circuit of a game device according to the present embodiment.

FIG. 1 shows an example of a hardware block of an image processing circuit 2 of a game device 1 according to the present embodiment. The image processing circuit 2 is capable of being used in applications such as game devices for commercial or private use, personal computers, portable type computers, and mobile telephones.

The game device 1 is constituted by a CPU (central processing unit) 10 that operates by a program and provides overall control of the game device 1, a system memory 11 containing programs and data that the CPU 10 uses, a storage medium 12 such as a ROM (read only memory) for program data in which data such as game programs, images to be output, and audio data are stored, a boot ROM 13 that contains programs for initializing each block when the game device 1 is started, a bus arbiter 14 that controls the buses by which programs and data are handled among the blocks, a geometric processor 15 that calculates a three-dimensional virtual space for (polygonal) objects (display items) to be displayed on a display or positional coordinates and orientation within two-dimensional coordinates, a rendering processor 16 that generates (draws) images to be output on the display based on the orientation and positional coordinates of the object calculated by the geometric processor 15, a graphics memory 17 that is connected to this and contains data and commands for generating images, an audio processor 18 that generates audio to be output to speakers, and an audio memory 19 that is connected to this and contains data and commands for generating audio. The numerical symbol 20 represents a communications I/F and the numerical symbol 21 represents a peripheral interface.

It should be noted that the system memory 11, the graphics memory 17, and the audio memory 19 may be configured by being connected by the bus arbiter 14 on a single memory shared commonly for various functions. Furthermore, the functional blocks may exist as functions within the image processing circuit 2 and these functional blocks may be integrated with each other or constituent elements among the functional blocks may be separated as other blocks.

For example, the storage medium 12, which is a ROM for program data, may be an IC memory that reads data electrically such as a mask ROM or a flash ROM, and may be a device that reads data optically such as a CD-ROM or a DVD-ROM with an optical disk or a magnetic disk. The peripheral interface 21 incorporates an interface for carrying out data input-output from outside and peripheral(s) are connected here as peripheral device(s).

In addition to mice (pointing devices), keyboards, switches for key operation such as game controllers, and touch panels, peripherals include other components capable of being connected to the image processing device main unit or another peripheral such as backup memories for saving data during the running of a program or generated therefrom, display devices, and image capturing devices and the like.

(2) Resource Management Functions

Next, a resource management function is described that is employed in a game executed by the game device 1. The resource management function is a function that works under the control of the CPU 10 according to a game program when the game is being reproduced by the CPU 10 executing a game program stored in the storage medium 12.

In the case of the present game, when a virtual three-dimensional space (hereafter referred to as "game space") is viewed from an arbitrary view point position inside the game space, scenery inside the game space such as buildings and passersby present in, for example, a rectangular frustum shaped field-of-view range (hereafter referred to as "viewing frustum") are displayed on a display monitor as a game screen as images obtained by being projected and drawn on a two-dimensional plane. Then, by restricting the number of passersby who have no relation to the progress of the story being displayed on the game screen, the load on the CPU required to control the passersby and the waste of resources can be reduced.

Figure 2:
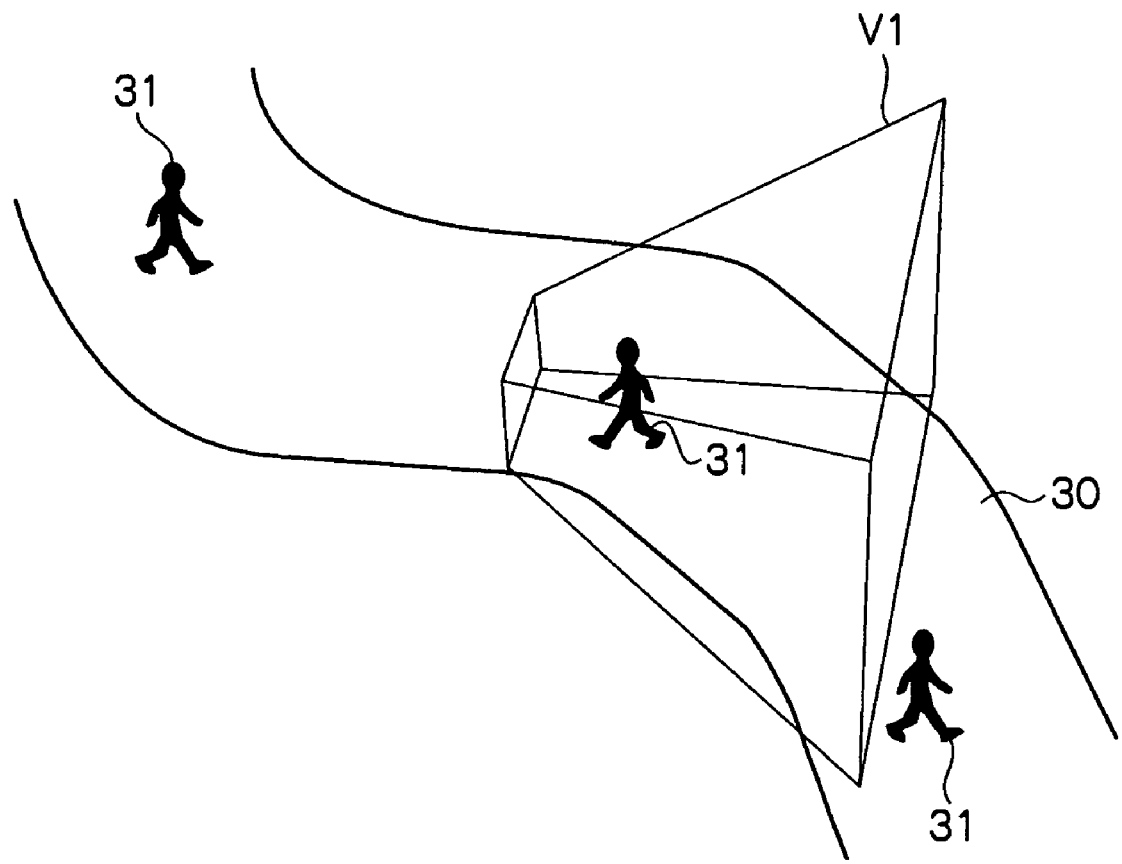
FIG. 2 is a schematic diagram providing description of a path and a viewing frustum.
Figure 3:
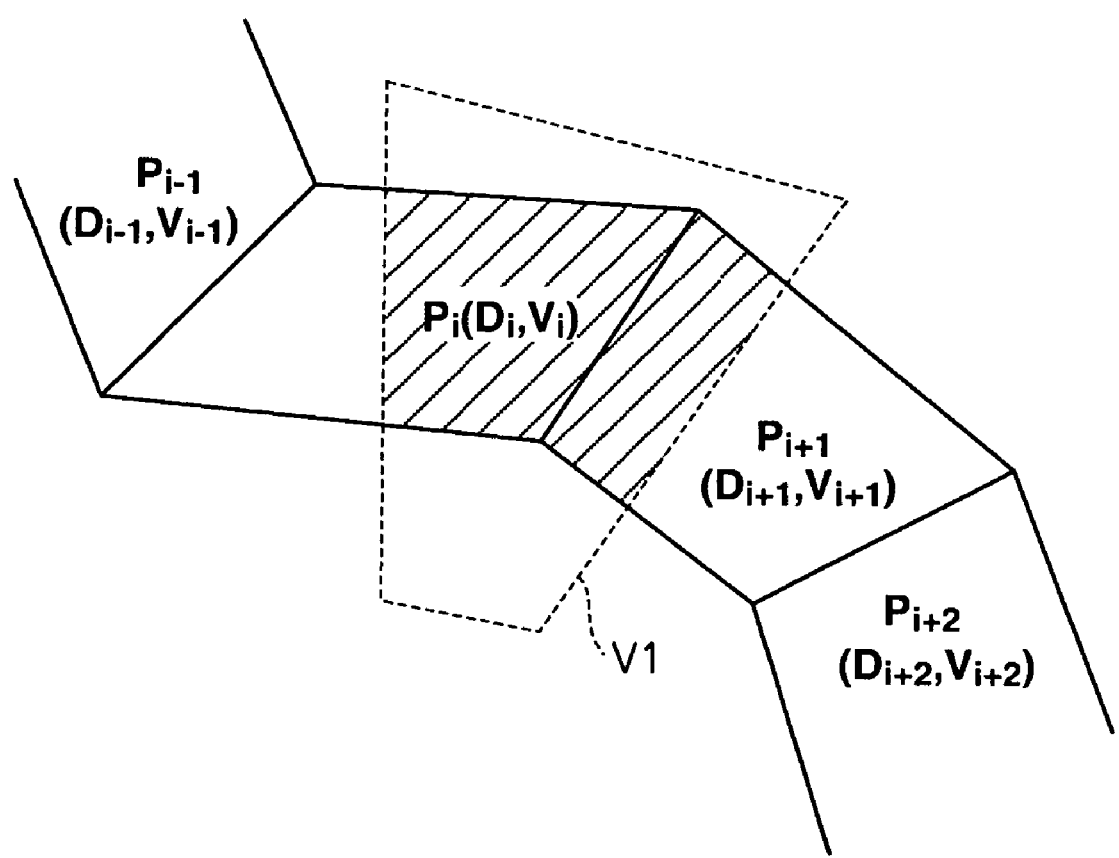
FIG. 3 is a schematic diagram providing description of path segments.

In fact, as shown in FIG. 2, in the present game there are several virtual paths (movement paths) 30 of predetermined shapes in the game space that are fixed in advance and passersby 31 having no relation to the progress of the story and who are present in the game space are set to move only on these paths 30. As shown in FIG. 3, each of the paths 30 is divided into a plurality of segments (hereafter referred to as "path segments") $P_i$ ($i=1, 2, \ldots$) along a lengthwise direction thereof and for each of these path segments $P_i$ a population density $D_i$ ($i=1, 2, \ldots$) in the path segment $P_i$ is set in advance. During execution of the game, the CPU 10 reads out from the program data stored in the storage medium 12 the population density $D_i$ that is set for the path segments $P_i$ corresponding within the paths 30 then, based on the population density $D_i$, restricts the number of passersby 31 who move within a viewing frustum V1 in that path 30.

Movement velocities $V_i$ ($i=1, 2, \ldots$) are set in advance for the path segments $P_i$ in the paths 30. During execution of the game, the CPU 10 reads out from the program data stored in the storage medium 12 the movement velocity $V_i$ that is set for the path segments $P_i$ corresponding within the paths 30 then controls the movement velocities of passersby 31 so that the passersby 31 moving in those path segments $P_i$ move at that movement velocity $V_i$.

If further management of the passersby 31 outside the viewing frustum V1 were to be carried out, it would place an excessive load on the CPU 10 and use a great deal more memory resources. Accordingly, in the case of the present game, the load on the CPU 10 is even further reduced and wastage of memory resources can be prevented by generating the passersby 31 immediately before the passersby enter the viewing frustum V1, carrying out the management involved only for the passersby 31 that move inside the viewing frustum V1, and carrying out a process by which these passersby 31 are deleted from the game space at the stage when these passersby 31 move away from the viewing frustum V1.

Figure 4:
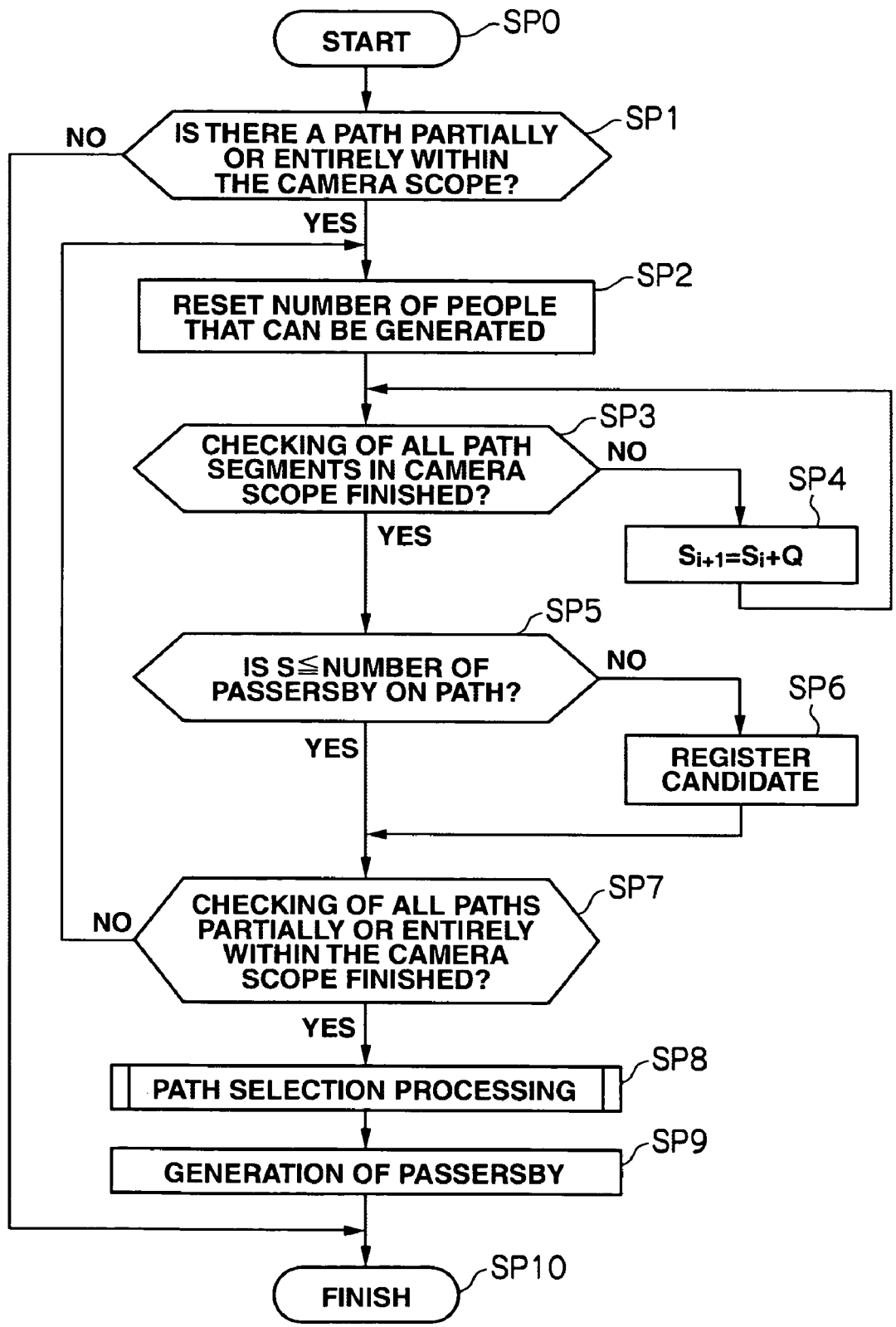
FIG. 4 is a flowchart showing a processing procedure of a CPU relating to processing for generating passersby.

FIG. 4 is a flowchart showing a processing procedure of the CPU 10 relating to an algorithm for generating the passersby 31 as one of the resource management functions of the present embodiment. By executing this processing procedure at set intervals, the CPU 10 generates the passersby 31 one by one with a necessary timing.

Specifically, the CPU 10 starts this processing procedure each set time at step SP0 then following this at step SP1 determines whether or not any path(s) 30 are present that enter a portion or all of the viewing frustum V1 for displaying the game screen.

If the CPU 10 obtains a negative result at step SP1, then the procedure proceeds to step SP10 and the processing procedure finishes, but if an affirmative result is obtained at step SP1, then the procedure proceeds to step SP2 after selecting one of the paths 30 and the CPU 10 resets a number of people that can be generated S (sets the number of people that can be generated to "0"), which is the maximum number of passersby 31 that can be generated inside the game screen.

Following this the procedure proceeds to step SP3 and the CPU 10 determines whether or not a computation process (step SP4) to be described later is finished for all the path segments Pi in the viewing frustum V1 of that path 30.

When a negative result is obtained at step SP3, the procedure proceeds to step SP4 and the CPU 10 selects one of the path segments Pi that is in the viewing frustum V1 of that path 30 then multiplies a area of a portion in the viewing frustum V1 of that path-segment Pi (for example, the area marked by diagonal lines of the path segments Pi and Pi+1 in FIG. 3) by the population density Di that has been set in advance for that path segment Pi, thereby calculating an upper limit number Q that can be generated in that path 30 at that time and adding the upper limit number Q to the number of people that can be generated S stored at that time. The CPU 10 then repeats the loop of steps SP3-SP4-SP3 until the same computation process is completed for all the path segments Pi in the viewing frustum V1 of the paths 30 thereafter, thereby calculating the number of people that can be generated S, which is the maximum number of people of the passersby 31 than can be generated on the path 30 at that time.

When an affirmative result is finally obtained at step SP3 by the completion of the computation processes of step SP4 for all the path segments Pi in the viewing frustum V1 of that path 30, the procedure proceeds to step SP5 and the CPU 10 determines whether or not the number of people that can be generated S that is stored at that time is smaller than the number of passersby 31 already on the path 30.

Here, when an affirmative result is obtained at step SP5, it means that the number of passersby 31 generated on the path 30 being targeted at that time already exceeds the number of people that can be generated S. Thus, at this time, the CPU 10 proceeds to step SP7 and carries out processing to be described below.

In contrast to this, when a negative result is obtained at step SP5, it means that the number of passersby 31 present on the path 30 being targeted at that time does not yet exceed the number of people that can be generated S. Thus, at this time, the CPU 10 proceeds to step SP6, registers that path 30 as a candidate path for generating passersby 31, then proceeds to step SP7.

Having proceeded to step SP7, the CPU 10 determines whether or not the check of the above-described step SP3 to step SP5 is completed for all the paths 30 in a portion or all of the viewing frustum V1. When the CPU 10 obtains a negative result at step SP7, it returns to step SP2, and repeats a loop of the steps SP2-SP7-SP2 until an affirmative result is obtained at step SP7.

Figure 5:
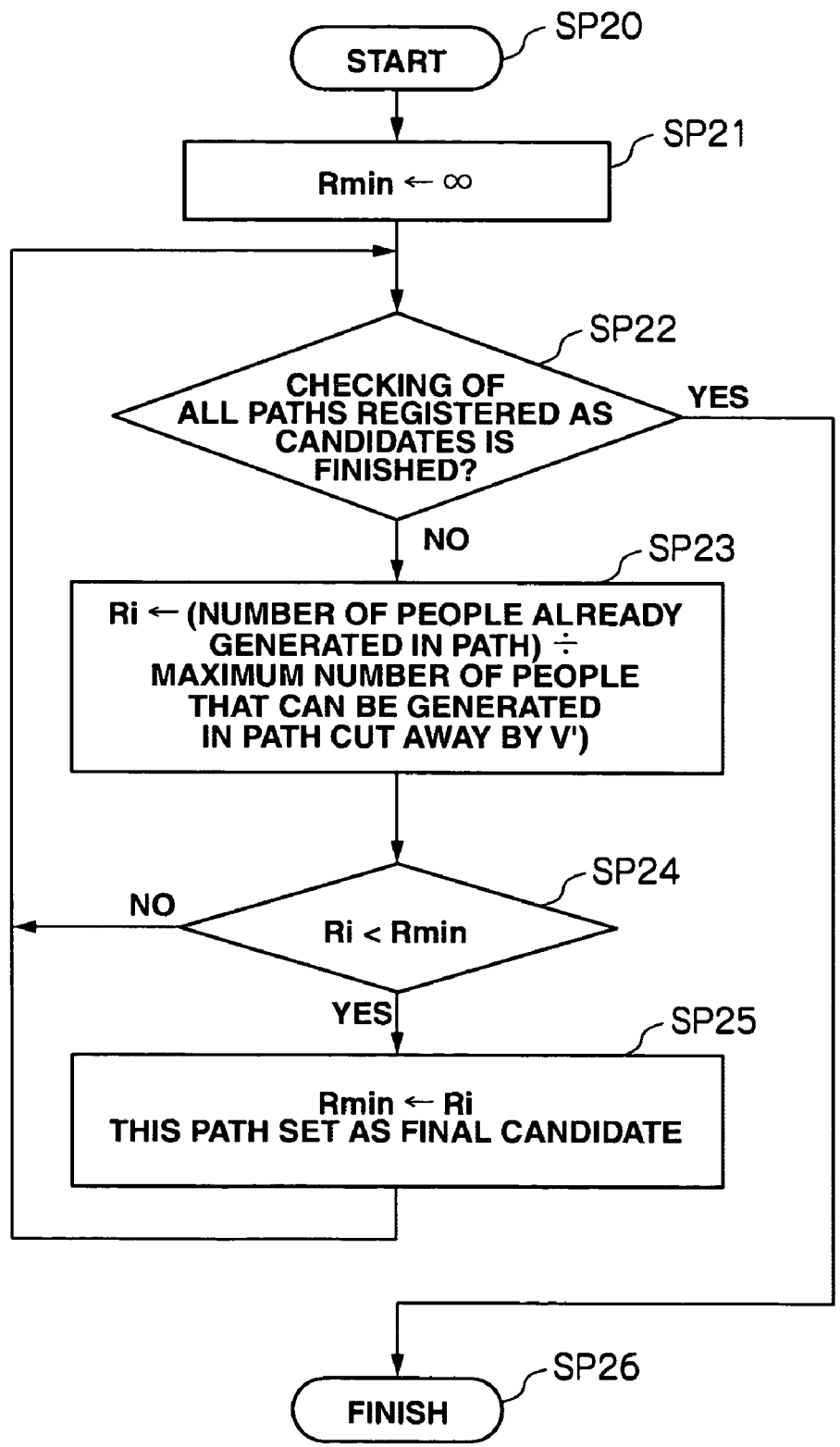
FIG. 5 is a flowchart showing a processing procedure of a CPU relating to processing for generating passersby.

On the other hand, when an affirmative result is obtained at step SP7, the procedure proceeds to step SP8 and, in accordance to the processing procedure shown in FIG. 5, the CPU 10 selects from among the paths 30 registered at step SP4 a path in which passersby should be generated at that time.

Specifically, when the procedure proceeds to step SP8, the CPU 10 commences the processing procedure at step SP20 shown in FIG. 5 then following this at step SP21 selects one of the paths 30 among the paths 30 registered in step SP6 of the processing procedure of FIG. 4, after which the CPU 10 sets a predetermined value, which has been set in advance, as an initial value of a comparison standard value Rmin to be described below. It should be noted that the predetermined value may be any value greater than one so that a fullness rate Ri to be described below can be obtained that is fundamentally less than one.

Following this, the CPU 10 proceeds to step SP22 and determines whether or not the processing of step SP23 to step SP25, which are to be described below, have been completed for all the paths 30 registered as candidates in step SP6 of the processing procedure of FIG. 4.

Then, when an affirmative result is obtained at step SP22, the CPU 10 proceeds to step SP26 and completes the processing procedure, after which the procedure proceeds to the processing procedure of step SP9 in FIG. 4. In contrast to this, when a negative result is obtained at step SP22, the procedure proceeds to step SP23 and the CPU 10 calculates the fullness rate Ri for that path 30 by dividing the number of passersby 31 already generated in the path 30 by the upper limit number Q, which is the number capable of being generated in the path 30 corresponding to that time calculated in step SP4.

Following this, the procedure proceeds to step SP24 and the CPU 10 determines whether or not the fullness rate Ri calculated in step SP23 is lower than the comparison standard value Rmin. When the CPU 10 obtains a negative result at step SP24, the procedure returns to step SP22, after which the steps SP22 to SP24 are processed in the same manner for the other paths 30 registered as candidates.

In contrast to this, when the CPU 10 obtains an affirmative result at step SP24, the procedure proceeds to step SP25, and the fullness rate Ri of the path 30 is set to the comparison standard value Rmin, after which the procedure returns to step SP22, then the steps SP22 to SP24 are processed in the same manner for the other paths 30 registered as candidates.

Then, when an affirmative result is obtained in SP24 by the processing of steps SP22 to SP24 finally being completed for all the paths 30 registered as candidates in the viewing frustum V1, the CPU 10 proceeds to step SP25 and the path 30 is set to the final candidate as the path 30 in which passersby 31 are to be generated. As a result, the path 30 having the lowest fullness rate Ri is set as the final candidate.

Then the CPU 10 returns to step SP22 and repeats the steps SP22 to SP25 until an affirmative result is obtained at step SP22. After this, when an affirmative result is finally obtained at step SP22, the CPU 10 returns to step SP8 of the processing procedure shown in FIG. 4 after which it then proceeds to step SP9 and generates only one passerby 31 on the path 30 selected as the final candidate.

Figure 6A:
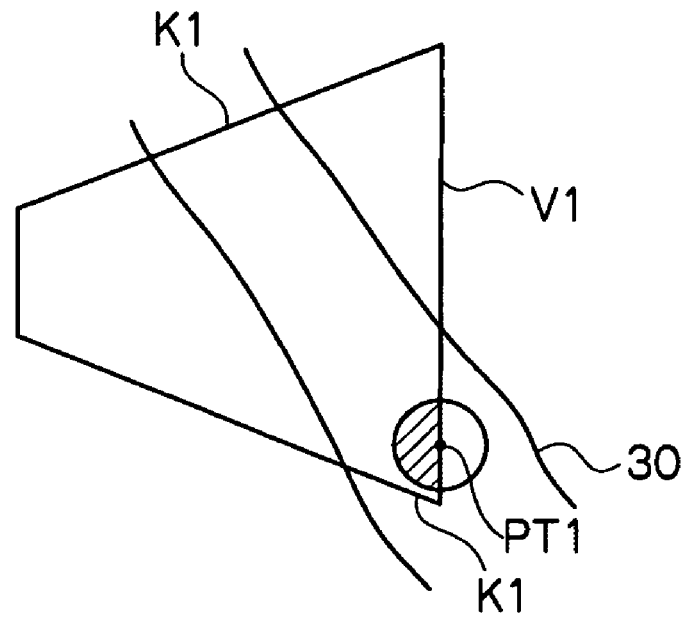
FIG. 6 is a schematic diagram providing description of a drawing commencement position prescribed region.

At this point, when the drawing of the passerby 31 is set to commence so that a base point (for example, the center of the passerby, although there is no limitation to the center as long as it is near the center of the passerby) PT1 of the passerby is positioned on a boundary line K1 when the viewing frustum V1 is projected onto the path 30 as shown in FIG. 6A with the aim of shortening as much as possible the management time of the CPU 10 for the passerby 31, there is a possibility that a portion (the portion indicated by diagonal lines in FIG. 6A) further on the viewing frustum V1 side than the base point PT1 of the passerby 31 at an edge area of the game screen will appear suddenly since the passerby 31 is large to a certain extent, which may cause a player to feel a sense of unnaturalness.

Figure 6B:
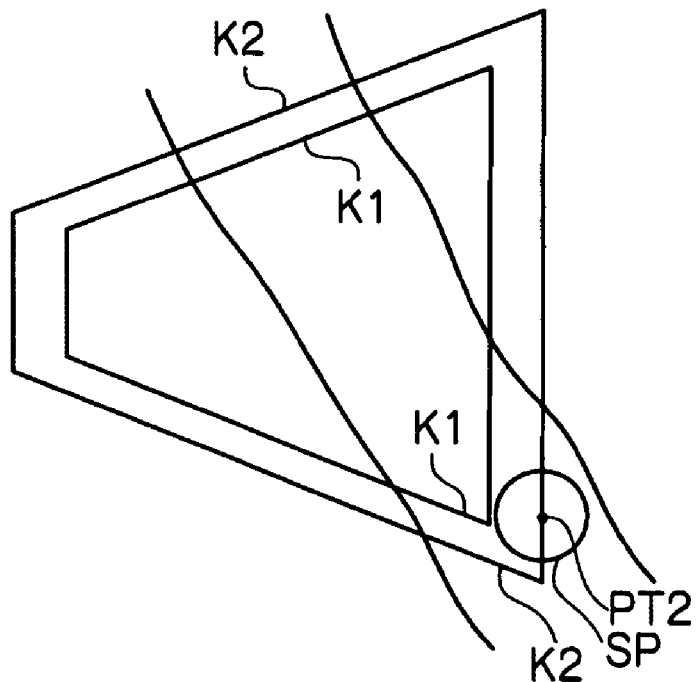

Accordingly, in the case of the present embodiment, the CPU 10 sets within the game space a drawing commencement position prescribed region V2 in which the boundary surfaces of the viewing frustum V1 have been moved respectively in an outer side normal line direction by half the diameter of a sphere SP that entirely contains the passerby 31 as shown in FIG. 6B and commences drawing of the passerby 31 so that a base point PT2 of the passerby 31 is positioned on a boundary line K2 when the drawing commencement position prescribed region V2 is projected onto the path 30.

Specifically, the CPU 10 calculates the positional coordinates and orientation of the passerby 31 in the game space by controlling the geometric processor 15 and stores in the graphics memory 17 information that is necessary for drawing the passerby 31 based on the calculation result and information such as the outer form of the passerby 31, which is contained as a part of the game program in the storage medium 12. In this way, the passerby 31 is drawn such that the passerby's base point PT2 is positioned on the boundary line K2 when the drawing commencement position prescribed region V2 is projected onto the corresponding path 30 based on the information stored in the graphics memory 17. In this way, in the present game, the passerby 31 does not appear within the viewing frustum V1 when drawing of the passerby 31 commences and the passerby 31 can be made to appear in the viewing frustum V1 in a natural form.

It should be noted that information of the position of the passerby 31 stored in the graphics memory 17 is successively updated under the control of the CPU 10 based on such factors as the movement velocities Vi set respectively for the path segments Pi of the corresponding path 30. In this way, each of the passersby 31 can be drawn by the rendering processor 16 as if moving in the corresponding path segment Pi of the corresponding path 30 at the set movement velocity Vi based on the positional information of the passerby 31 stored in the graphics memory 17.

In this regard, when the commencement position and the finishing position of management for a passerby 31 are both set on the boundary line K2 when the drawing commencement position prescribed region V2 is projected onto the path 30, unnaturalness can occur easily in the swinging (orientation variation) of the viewing frustum V1. For example, there are cases in which immediately after a passerby 31 has disappeared outside the viewing frustum V1 due to swinging of the viewing frustum V1, the viewing frustum V1 is again faced toward the previous direction. In this case, when the finishing position for management of the passerby 31 is on the boundary line K2, the player can be made to feel a sense of unnaturalness in that when a passerby 31 disappears from the game space at a stage having moved away once from the viewing frustum V1, the passerby 31 does not appear on the game screen again when the viewing frustum V1 is again faced toward the previous direction.

Figure 7:
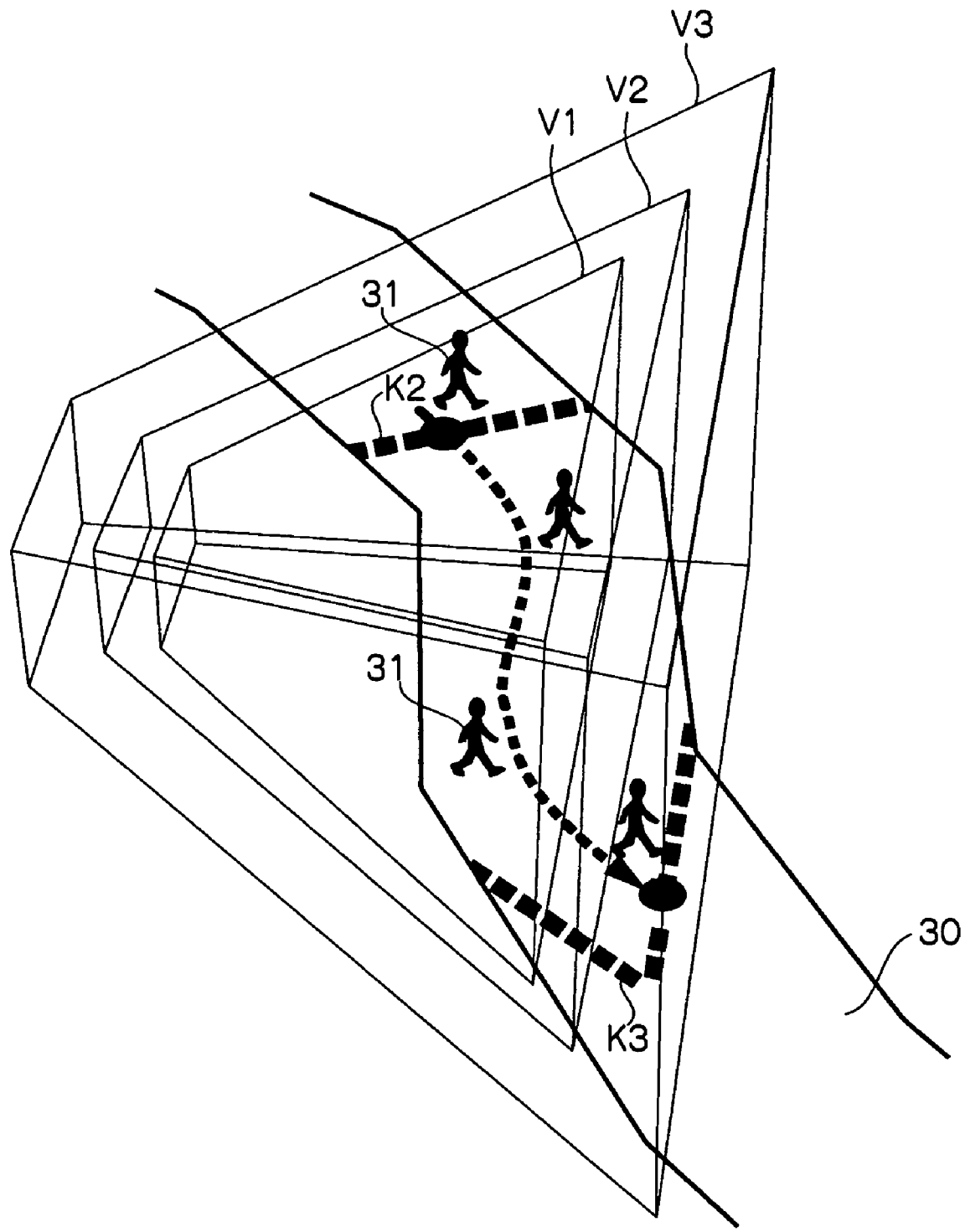
FIG. 7 is a schematic diagram providing description of a management completion position prescribed region.

Accordingly, the present game is configured such that a management completion position prescribed region V3 is set that is even larger than the drawing commencement position prescribed region V2 of the viewing frustum V1 as shown in FIG. 7, and management of a passerby 31 finishes at a stage when the base point PT1 of the passerby 31 goes outside the management completion position prescribed region V3 and the passerby 31 is deleted from the game space.

Figure 8:
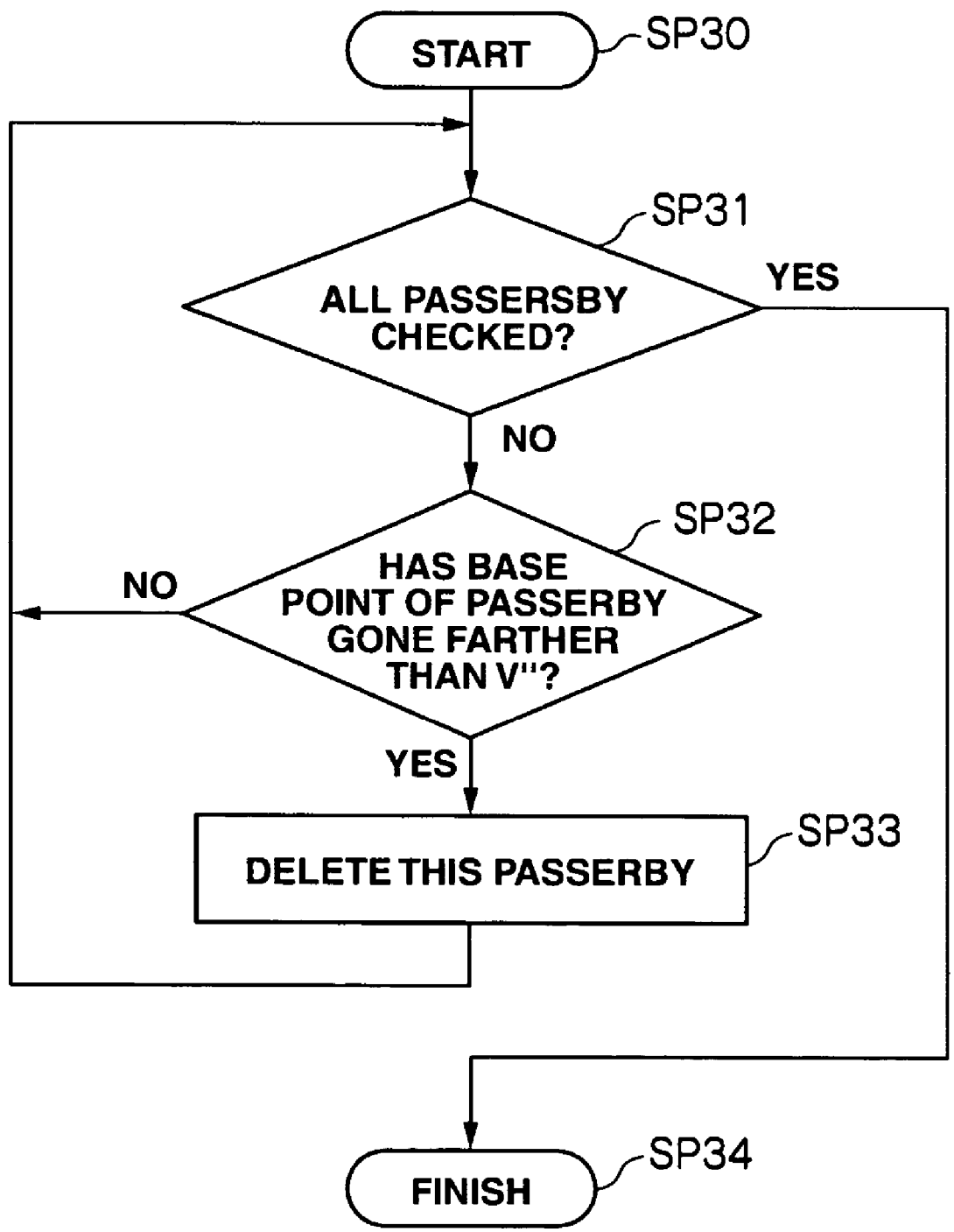
FIG. 8 is a flowchart showing a processing procedure of the CPU relating to processing for deleting passersby.

FIG. 8 is a flowchart showing a processing procedure of the CPU 10 relating to an algorithm for deleting the passerby 31. The CPU 10 deletes from the game space passersby 31 that have moved away from the viewing frustum V1 by executing this processing procedure at a set interval.

Namely, when this processing procedure starts step SP30, the CPU 10 determines in the following step SP31 whether or not a check to be described later has been carried out at step SP32 in regard to all the passersby 31 present in the management completion position prescribed region V3 at that time.

When a negative result is obtained at this step SP31, the CPU 10 proceeds to step SP32 and determines whether a base point PT1 (shown in FIG. 6A) which is set for the passerby 31 went outside the management completion position prescribed region V3. When a negative result is obtained at step SP32, the procedure returns to step SP31 and the CPU 10 repeats a loop of the steps SP31-SP32-31 while successively changing the passerby 31 that is to be a subsequent object to another passerby 31. And when an affirmative result is obtained at step SP32, the CPU 10 proceeds to step SP33 and deletes that passerby 31 from the game space, then returns to step SP31.

The CPU 10 repeats the loop of the steps SP31-SP33-SP31 until an affirmative result is obtained subsequently at step SP31, and when an affirmative result is finally obtained at step SP31, the procedure proceeds to step SP34 and the processing procedure finishes.

Thus, in the present game, a virtual path 30 is defined within the game space, the path 30 is partitioned into a plurality of path segments Pi and a population density Di is set for each of the path segments Pi such that the number of passersby 31 appearing in the game screen is restricted based on the population densities Di for each of the path segments Pi, and therefore restriction of the number of passersby 31 can be carried out for each portion of the game screen. Also, in the present game, a management completion position prescribed region V3 is set outside the viewing frustum V1 and passersby 31 that have moved away from the management completion position prescribed region V3 are deleted from the game space, and therefore it is possible to prevent effectively the continued maintenance of memory resources for management of passersby 31 even after those passersby 31 have moved away from the game screen. Accordingly, with this game, very detailed image control can be carried out while preventing wastage of resources.

(3) Other Embodiments

It should be noted that the foregoing embodiment was described using a case in which one type of population density was set for each segment in the path, but the present invention is not limited to this and passersby may be sorted into a plurality of types such as male and female for example so that population densities may be set for each segment in the path for each of these types. In this case, the CPU may be configured to restrain the number of passersby moving on the path in terms of passerby type units using population densities for each of these types, thereby enabling even more detailed management of the passersby.

Furthermore, the foregoing embodiment was described using a case in which a management completion position prescribed region V3 was set that was larger than the drawing commencement position prescribed region V2 around the viewing frustum V1 and management of a passerby 31 finished at a stage when the base point PT1 of the passerby 31 went outside the management completion position prescribed region V3 and the passerby 31 was deleted from the game space, but the present invention is not limited to this and for example the passersby 31 may be deleted from the game space after a predetermined time has elapsed from the passerby 31 leaving the viewing frustum V1.

Further still, the foregoing embodiment was described using a case in which the target for management was the passersby 31, but the present invention is not limited to this and can be widely applied to the drawing of objects such as various moving objects including animals and automobiles as well as objects other than moving objects such as non-moving objects including buildings and the like.

INDUSTRIAL APPLICABILITY

The present invention may also be applied to a game device for either commercial or private use.

I claim:

1. A non-transitory computer-readable medium storing an image generating program executed on an image processing device that comprises control means, storage means, and image display means, wherein a viewpoint, a pathway having a predetermined shape, and a plurality of moving objects that move on the pathway are arranged in a virtual three-dimensional space, and the moving objects present in a viewing frustum, which is a field-of-view range of the viewpoint, are drawn by being projected on a two-dimensional plane, the image generating program causing the control means to execute a computer-implemented method comprising:
   a first step of calculating each of a plurality of predetermined segments of the pathway having the predetermined shape present within a certain region based on a field-of-view, wherein the first step further includes calculating an area value of the pathway;
   a second step of determining whether or not the moving objects are to be generated based on the predetermined segments within the certain region and whether the moving objects will enter the predetermined segments of the pathway, wherein the second step further includes:
      calculating an upper limit number of the moving objects to be generated based on the calculated area value and moving object densities each of which is represented by the number of the moving objects per unit area in the predetermined segments on the pathway; and
      determining whether to generate the moving objects based on the upper limit number of the moving objects;
   a third step, when a determination is made that the moving objects are to be generated, of storing in the storage means information of the moving objects to be generated;
   a fourth step of renewing positions of the moving objects present in the viewing frustum based on information of the plurality of moving objects stored in the storage means; and
   a fifth step of generating images of the plurality of moving objects.

2. The non-transitory computer-readable medium according to claim 1,
   wherein in the second step, information of the moving objects is stored in the storage means such that the moving objects to be generated are generated in a predetermined location outside the viewing frustum set in the virtual three-dimensional space.

3. The non-transitory computer-readable medium according to claim 1, further comprising:
   a sixth step of extinguishing any of the moving objects that have moved out of a predetermined region including the viewing frustum set in the virtual three dimensional space.

4. The non-transitory computer-readable medium according to claim 3,
   wherein the predetermined region for extinguishing the moving objects is set outside a region in which new moving objects are generated for the viewing frustum.

5. The non-transitory computer-readable medium according to claim 1, further comprising:
   a sixth step of extinguishing any of the moving objects when any such moving objects have moved out the viewing frustum and a predetermined time has elapsed.

6. The non-transitory computer-readable medium according to claim 1,
   wherein in the second step,
      the upper limit number of the moving objects is calculated by the multiplication of the area value and the moving object densities in the predetermined segments on the pathway, and
      whether the moving objects are to be generated is determined additionally based on the number of the moving objects present on the pathway.

7. The non-transitory computer-readable medium according to claim 1,
   wherein a movement velocity of the moving objects to be newly generated is set based on a moving object velocity that is set for each of the predetermined segments on the pathway.

8. The non-transitory computer-readable medium according to claim 6,
   wherein, when a plurality of pathways are present in a region based on the field-of-view, the moving objects are generated in one of the pathways having a lower fullness rate with respect to the upper limit number of the moving objects.

9. A computer-implemented image processing method wherein a viewpoint, a pathway having a predetermined shape, and a plurality of moving objects that move on the pathway are arranged in a virtual three-dimensional space, and the moving objects present in a viewing frustum, which is a field-of-view range of the viewpoint, are drawn by being projected on a two-dimensional plane, the method being performed by a computer and comprising:
   a first step of calculating each of a plurality of predetermined segments of the pathway present within a certain region based on a field-of-view, wherein the first step further includes calculating an area value of the pathway;
   a second step of determining whether or not the moving objects are to be generated based on the predetermined segments within the certain region and whether the moving objects will enter the predetermined segments of the pathway, wherein the second step further includes:
      calculating an upper limit number of the moving objects to be generated based on the calculated area value and moving object densities each of which is represented by the number of the moving objects per unit area in the predetermined segments on the pathway; and determining whether to generate the moving objects based on the upper limit number of the moving objects;

a third step, when a determination is made that the moving objects are to be generated, of storing in the storage means information of the moving objects to be generated;

a fourth step of renewing positions of the moving objects present in the viewing frustum based on information of the plurality of moving objects stored in the storage means; and a fifth step of generating images of the plurality of moving objects.

10. An image processing device comprising control means, storage means, and image display means, wherein a viewpoint, a pathway having a predetermined shape, and a plurality of moving objects that move on the pathway are arranged in a virtual three-dimensional space, and the moving objects present in a viewing frustum, which is a field-of-view range of the viewpoint, are drawn by being projected on a two-dimensional plane, comprising:

predetermined segment calculation means for calculating each of a plurality of predetermined segments of the pathway having the predetermined shape present within a certain region based on a field-of-view, wherein the predetermined segment calculation means further calculates an area value of the pathway;

determination means for determining whether or not the moving objects are to be generated based on the predetermined segments within the certain region and whether the moving objects will enter the predetermined segments of the pathway, wherein the determination means further:

calculates an upper limit number of the moving objects to be generated based on the calculated area value and moving object densities each of which is represented by the number of the moving objects per unit area in the predetermined segments on the pathway; and determines whether to generate the moving objects based on the upper limit number of the moving objects;

storage control means for, when a determination is made that the moving objects are to be generated, storing in the storage means information of the moving objects to be generated;

renewing means for renewing positions of the moving objects present in the viewing frustum based on information of the plurality of moving objects stored in the storage means; and image generation means for generating images of the plurality of moving objects.

* * * * *